Aug. 1, 1972   J. L. BERGLES ET AL   3,681,236
SEWAGE TREATMENT PLANT AND METHOD OF TREATING SEWAGE
Filed Feb. 25, 1971   3 Sheets-Sheet 1

INVENTORS:
JOSEPH L. BERGLES
MARVIN A. NELSON
BY James E. Nilles
ATTORNEY

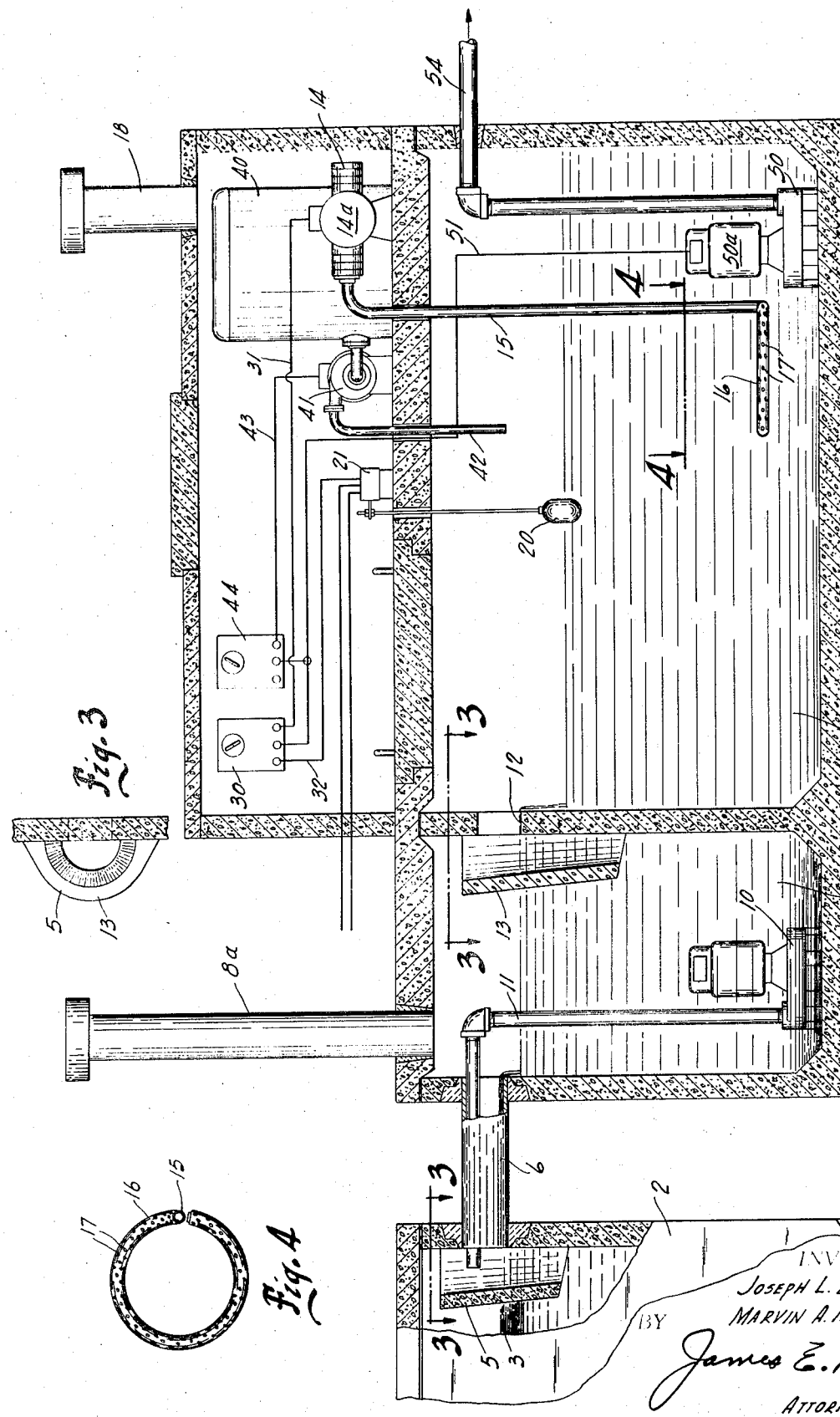

United States Patent Office 3,681,236
Patented Aug. 1, 1972

---

3,681,236
SEWAGE TREATMENT PLANT AND METHOD OF TREATING SEWAGE
Joseph L. Bergles, Rte. 2, Box 385, 3901 Three Mile Road, Franksville, Wis. 53126, and Marvin A. Nelson, Rte. 1, Box 169, Union Grove, Wis. 53182
Continuation-in-part of application Ser. No. 29,342, Mar. 31, 1970. This application Feb. 25, 1971, Ser. No. 118,754
Int. Cl. C02c 1/12
U.S. Cl. 210—16
9 Claims

ABSTRACT OF THE DISCLOSURE

A sewage treatment plant including a primary tank in which the majority of the sludge is settled from the sewage and in which an anaerobic biological action occurs, a second tank for receiving effluent from the first tank and in which second tank clarification occurs by settling of the remaining sludge; and a third tank in which an aerobic biological process occurs. This aerobic action is enhanced by an aeration process which is provided by an air supplying pump. The sewage plant also includes means for chlorinating the fluid in the third tank after it has been subjected to the aerobic action. Means are also provided for timing the action of the aeration pump, the chlorination pump, and the pump which removes the fluid from the second tank and discharges it to the final filter bed. The final filter bed is of a trickle filter type.

A non-continuous flow method of treating sewage including steps of subjecting raw sewage to anaerobic action to separate the majority of the sludge from the water, subjecting the resulting effluent to a clarification process while in a quiescent state, subjecting the clarified fluid to aerobic action, including aeration of the fluid, chlorination, and then subjecting the treated water to a final trickle filter.

BACKGROUND OF THE INVENTION

This application is a continuation-in-part application of application Ser. No. 29,342 filed Mar. 31, 1970, now abandoned, and entitled "Home Sewage Septic Plant."

The invention pertains to sewage treatment plants of the two stage type including anaerobic and aerobic processes. Such plants have generally been of the continuous flow type which results in effective purification of the water.

An example of the prior art type of apparatus over which the present invention is an improvement is shown in the U.S. Pat. 2,901,114 which issued Aug. 25, 1959 and entitled "Sewage Treatment Apparatus." In that apparatus, water flows out of the system whenever water flows into it, consequently there is no detention time or quiescent period during which the chlorination takes place; in other words, the chlorination is accomplished in a continually flowing fluid.

Another example of the prior art is shown in the U.S. Pat. 2,852,140 which issued Sept. 16, 1958, and entitled "Unitary Tank for the Treatment of Sewage." That patent discloses the anaerobic, aerobic, and aeration processes, but it does not have any clarification nor chlorination process, and particularly does not have any detention time for the flowing of fluid and in which chlorination can occur as contemplated by the present invention.

SUMMARY OF THE INVENTION

The present invention provides a sewage treatment plant which provides a first tank in which the major portion of the sludge is settled from the fluid, and which provides for an anaerobic biological action. The resulting fluid is then carefully transferred to a second tank in which further clarification of the water occurs and the remaining small amount of sludge is removed from the water. In a third tank aerobic biological action occurs and the tank has means for effectively aerating the fluid. The plant also includes means for chlorinating the fluid and also for consequently removing the fluid to a final filter bed, and suitable timers are provided for the various pumps. A final filter bed is provided which results in a trickle filter action.

The present invention provides a method of treating sewage including the steps of anaerobic biological action, clarification of the fluid, aerobic biological action of the fluid and aeration, chlorination of the fluid and then a final trickle filtering process.

The invention uses a detention of the fluid as opposed to a continuous flow type of system.

These and other objects and advantages of the present invention will appear hereinafter as this disclosure progresses, reference being had to the accompanying drawings.

BRIEF DESCRIPTION OF THE DRAWINGS

FIG. 2 is an enlarged, cross sectional view of a certain portion of the plant shown in FIG. 1;

FIG. 3 is an enlarged, cross sectional view taken along line 3—3 in FIG. 2;

FIG. 4 is a cross sectional view taken along the line 4—4 in FIG. 2;

DESCRIPTION OF A PREFERRED EMBODIMENT

Figure 1:
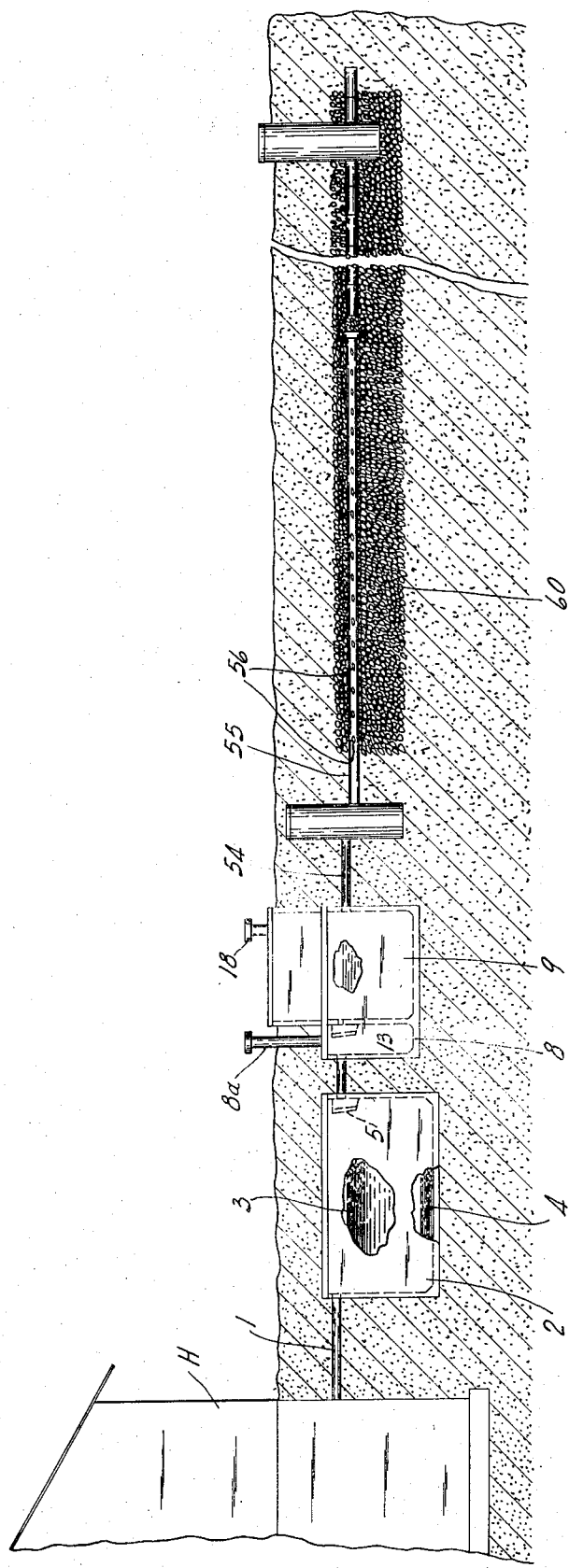
FIG. 1 is a vertical, cross sectional view through a sewage treatment plant made in accordance with the present invention.

The present invention finds particular utility when used in rather small installations such as homes. The raw sewage flows from the house H by means of the pipe 1 and into a first tank 2. This flow is rather small and may occur any time during a 24 hour period. However, during the night-time hours, this flow is particularly small and in any event, the flow more or less trickles into the tank 2. Because of the size of the tank, the level of the tank changes at only a very small rate. For example, the first tank 2 may be of a one thousand gallon capacity.

An anaerobic biological action by bacteria occurs in tank 2 and acts on the layer of raw sewage 3 which forms at the upper level of the fluid in the tank and as this anaerobic action occurs, the sludge drops down to the bottom of the tank as at 4 where it is removed from the tank only infrequently. Thus, in tank 2, the anaerobic action causes the conversation or organic sewage and waste material to $Co_2$ and water, thereby producing sludge, and it is this sludge that settles to the bottom of the tank. Thus, the bacteria act in tank 2 to cause the greater majority of the sludge, said approximately 98 percent by way of example only, to settle out in tank 2.

A vertically arranged, U-shaped baffle 5 is provided at the inlet side of a fluid communication in the form of a pipe 6 which places tank 2 in communication with the second tank 8. In this manner, the relatively clear fluid flows from tank 2 into tank 8 which is a settling chamber in which the remaining sludge settles out to the bottom. Periodically the pump 10 transfers the sludge at the bottom of compartment 8 via pipe 11 and back into tank 2. While in compartment 8, the water is held in a quiet state, so that the suspended organic material gradually settles to the bottom of the material as sludge, and the water is thus clarified. This compartment 8 thus forms a settling chamber for the final clarification of the sludge from the water. Tank 8 has a vent 8a.

The clear water passes from compartment 8 to compartment 9 via the fluid communication or opening 12, and another U-shaped, vertically disposed baffle 13 is provided in compartment 8 and at the inlet side of the opening 12 so that the passage of the water from compartment 8 to compartment 9 is in a turbulent-free manner, and the baffle prevents any solid particles from entering compartment 9.

While in tank 9, the water is subjected to an aerobic biological action and in order to aid this action, an aeration process is provided. Aeration of the water in tank 9 is provided by a compressor 14, by means of which air is pumped via pipe 15 and through a horizontally disposed circular loop 16 which contains many perforations 17. Thus the air is forced to bubble through the compartment 9, thoroughly aerating the water, thus aiding aerobic biological action. In other words, the addition of oxygen to the water is necessary for this aerobic biological process and the bacteria and microbes purify the polluted water and various gases are released, which results in clean and odorless water. A vent 18 is provided for tank 9 so as to vent it and also provide a source of air for the compressor 14.

More specifically, the apparatus and operation is as follows.

Float 20 is provided for the fluid in compartment 9 and when the fluid raises to a certain predetermined level it actuates an electrical float switch 21. Switch 21 may be of the two-pole liquid level stage type which is float or weight operated, such as for example of the type No. 159H, Model 1001, made by Penn Controls, Inc. of Goshen, Ind. 46526. When the float switches closes, the main electrical line to the air compressor timer 30 is closed. The air compressor 14 is operated by an electric motor 14a in conventional manner and may be of the Bell and Gossett Co. type, which company is located at Morton Grove, Ill. The compressor motor is connected to a timer 30 via line 31 and the float switch 21 is also connected to timer 30 via line 32.

A tank of chlorine 40 supplies chlorine to the water via the electrically operated pump 41 at the appropriate time, the chlorine being pumped through the conduit 42 into the water. The motor 41a of the chlorine pump 41 is connected to another timer 44 via line 43. A submersible sump pump 50 is located at the bottom of compartment 9 and its electric motor 50a is connected via line 51 to both of the timers 30 and 44. This pump is conventional and may be of the type manufactured by Dayton Electric Mfg. Co. of Chicago, Ill. 60648.

The pump 50 acts to discharge the water out of compartment 9 via pipe 54 and into a long plastic pipe 55 containing numerous holes 56, all of which will be described later.

Figure 5:
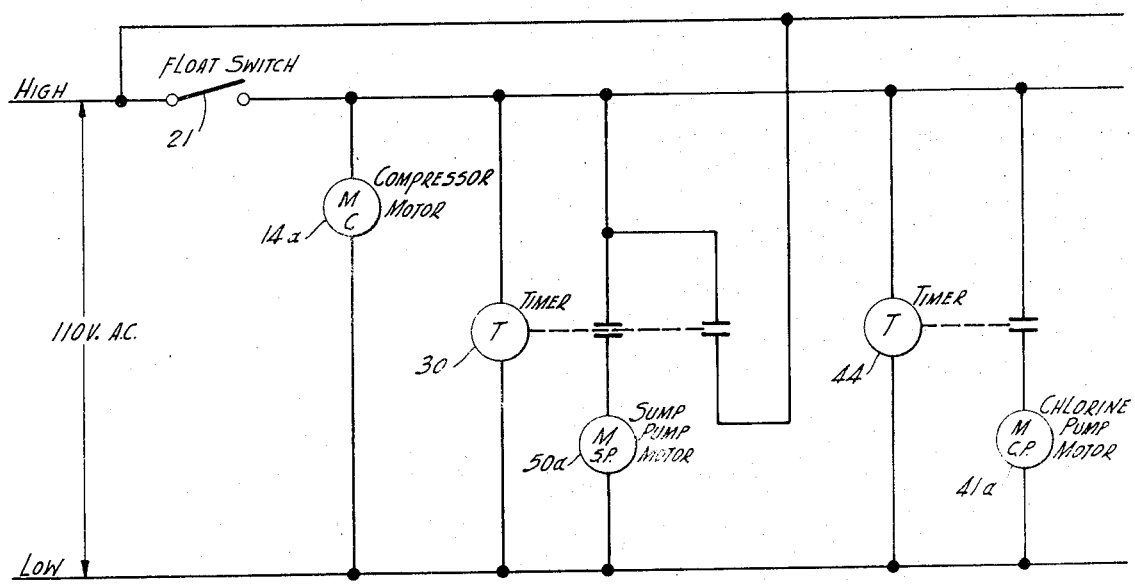
FIG. 5 is an electrical circuit used with the present sewage plant.
Figure 6:
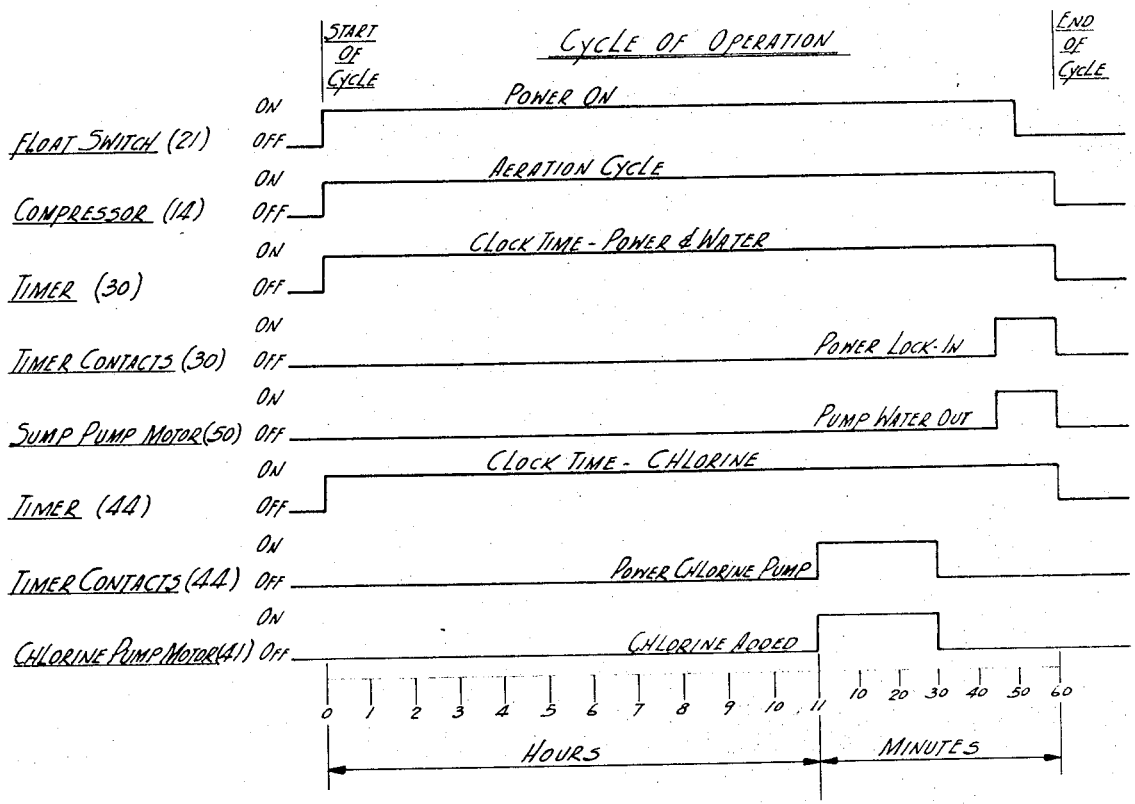
FIG. 6 is a sequence chart showing the various steps in the method.

Referring to FIG. 5, the electrical connection between the various timers and pumps is clearly shown. By way of example, the complete processing cycle of operation of twelve hours will be described, it being understood that this twelve hour cycle occurs every twenty-four hours.

The raw sewage can continually run from the house into the first tank 2. The effluent water then flows into tank 8 from which clarified water then flows to tank or compartment 9. When the water in compartment 9 has risen to a sufficient level, the float 20 causes switch 21 to close and electrical power is applied to the compressor motor 14a, timer 30, and also to timer 44. The compressor then delivers air, say approximately four c.f.m., into the effluent for a period of approximately twelve hours, which period is controlled by the timer 30 based on a twelve hour processing cycle and a twelve hour "off" period. After the compressor has been operating eleven and one-quarter hours to provide the aeration, a chlorination process occurs. The chlorine pump motor 41a is actuated by the timer 44, power already having been supplied to this timer 44. Then the chlorine timer 44 causes the pump 41 to deliver chlorine to the water for approximately one-half hour. During this one-half hour, or approximately eleven hours and forty-five minutes after the processing cycle has started, the timer 44 turns off by itself and timer 30 then locks in to start the pump 50 to empty the tank. During this time, the compressor stays on to keep the chlorine and water mixed. Then at the end of the twelve hour period, everything shuts off and timer 30 drops out.

With the present invention, after the water has been aerated for about eleven hours, then it is held or detained for another one-half hour. During this one-half hour it is chlorinated. After that, about fifteen minutes elapses for a detention time to insure complete bacteria kill. Then a final 15 minute period is required to pump out the processed water by the pump 50 to the filter bed 60. When the pump 50 starts, the water level begins to lower but the timer 30 has been locked in, and during this last fifteen minutes of pump 50 operation, the compressor continues to operate, thereby assuring continued mixing of the chlorine and water. After the pump has run for about fifteen minutes, the water level reaches its lower limit, and the float 20 then causes switch 21 to open, thereby setting the switch for the next cycle. The timer 30 then opens, thereby stopping pump motor 50a and compressor motor 14a.

The final stage is a filter trickle stage and for this purpose, a gravel and/or sand bed 60 is provided through which the plastic, perforated tube 55 passes adjacent the upper portion of the bed. The action of the pump 50 is to force the water in a jet action spray through the plastic tube and into the top of the gravel bed through which it is then thoroughly filtered. It is noted that the plastic pipe or tube 55 is located at the upper side of the bed so that the water can be discharged and then trickles through the gravel for a final filtering process.

The present invention provides a sewage treatment process in which the unprocessed effluent is held or detained for approximately twelve hours, during which time anaerobic, clarification and aerobic processes take place. After the effluent has been aerated for approximately eleven hours the chlorination process starts, that is the chlorine pump acts for approximately one-half hour. Then a quarter hour detention time elapses to insure complete bacteria kill. During the final fifteen minutes of the process, the fluid is pumped out. Aeration has continued for the full twelve hour period to assure complete mixture of the chlorine throughout the process. At no time does unprocessed effluent flow out of the system.

We claim:

1. A sewage treatment plant comprising, a first tank for receiving raw sewage, a second tank and having a fluid receiving communication with said first tank and adjacent the upper side of said tanks, a third tank having a fluid receiving communication with said second tank, and aerating apparatus for said third tank and including an electrically driven compressor for supplying air to the fluid in said third tank, a chlorinating means for said third tank including an electrically driven chlorine pump for supplying chlorine to the water in said third tank, a filtering bed, tubular means located in the upper portion of said bed for distributing water over the bed, discharge pump means in said third tank for pumping treated water out of said third tank and through said tubular means; and electrical control means for timed operation of said compressor, said chlorine pump, and said fluid pump, said control means including timer means and a water level responsive electric switch connected with said timer means whereby a rise in water level in said third tank to a predetermined height will actuate said switch to commence operation of said timer means and consequently sequential operation of said compressor, said chlorine pump, and said fluid pump.

2. The plant as set forth in claim 1 including a fluid pump in said second tank and adjacent the bottom thereof and having pipe means extending into said first tank for pumping sludge from the bottom of said second tank into said first tank.

3. The plant as set forth in claim 1 including baffle means adjacent the inlet end of the fluid receiving communication between said first tank and said second tank and a second baffle means at the inlet end of the said fluid receiving communication between said second tank and said third tank.

4. The plant as set forth in claim 1 further characterized in that said aerating means includes a horizontally disposed tubular loop having a series of air ejection apertures therein whereby said air is widely dispersed in said fluid, said loop being located adjacent the lower portion of said third tank.

5. A sewage treatment plant comprising, a first tank for receiving raw sewage, a second tank and having a fluid receiving communication with said first tank and adjacent the upper side of said tanks, a third tank having a fluid receiving communication with said second tank; baffle means adjacent the inlet end of the fluid receiving communication between said first tank and said second tank, a second baffle means at the inlet end of said fluid receiving communication between said second tank and said third tank; and aerating apparatus for said third tank and including a horizontally disposed tubular loop having a series of air ejection apertures therein, said loop being located adjacent the lower portion of said third tank, said apparatus also including an electrically driven compressor for supplying air to said loop so as to widely disperse air in the fluid in said third tank, a chlorinating means for said third tank including an electrically driven chlorine pump for supplying chlorine to the water in said third tank, a filtering bed, tubular means located in the upper portion of said bed for distributing water over the bed, discharge pump means in said third tank for pumping treated water out of said third tank and through said tubular means; and electrical control means for timed operation of said compressor, said chlorine pump, and said fluid pump, said control means including timer means and a water level responsive electric switch connected with said timer means whereby a rise in water level in said third tank to a predetermined height will actuate said switch to commence operation of said timer means and consequently sequential operation of said compressor, said chlorine pump, and said fluid pump.

6. The plant as set forth in claim 5 including a fluid pump in said second tank and adjacent the bottom thereof and having pipe means extending into said first tank for pumping sludge from the bottom of said second tank into said first tank.

7. A method of treating sewage comprising the steps of subjecting raw sewage to anaerobic biological action in a first tank, transferring the fluid to a second tank and holding said fluid in a quiet state for clarification of said fluid by permitting the remaining sludge to settle to the bottom of said second tank, transferring the clarified fluid to a third tank and subjecting it to aerobic biological action while aerating said fluid to facilitate said aerobic biological action, chlorinating said fluid, removing said fluid from said third tank and subjecting it to a trickle filtering process in the ground.

8. The method set forth in claim 7 further characterized in that said time of aeration is approximately eleven and three-quarters hours and the time of chlorination is approximately one-quarter of an hour and during the last portion of the said aeration period.

9. A method of treating sewage comprising the steps of subjecting raw sewage to anaerobic biological action in a first tank, permitting the fluid to flow to a second tank, holding said fluid in a quiet state in said second tank for clarification of said fluid by permitting the remaining sludge to settle to the bottom of said second tank, permitting the clarified fluid to flow to a third tank, subjecting the fluid in said third tank to aerobic biological action for a period of about eleven hours while aerating said fluid to facilitate said aerobic biological action, chlorinating said fluid for about one-half hour, holding the chlorinated fluid for about one-quarter hour, and then removing said fluid from said third tank over a period of about fifteen minutes and forcing it through a perforated tube and into a trickle filter bed in the ground.

References Cited

UNITED STATES PATENTS

| | | | |
|---|---|---|---|
| 1,439,406 | 12/1922 | Elrod | 210—16 |
| 1,893,623 | 1/1933 | Imhoff | 210—220 X |
| 3,047,492 | 7/1962 | Gambrel | 210—195 X |
| 3,522,881 | 8/1970 | Nicol | 210—139 X |
| 3,558,483 | 1/1971 | Dodgson | 210—62 |

JAMES L. DE CESARE, Primary Examiner

U.S. Cl. X.R.

210—62, 139, 195, 220